3,167,516
PROCESS FOR THE PRODUCTION OF HEAT-RESISTANT PIGMENTS AND PAINTS CONTAINING SAID PIGMENTS
Paul R. Brayton, 1123 Stratford Ave., South Pasadena, Calif.
No Drawing. Filed Dec. 13, 1962, Ser. No. 244,299
9 Claims. (Cl. 252—301.1)

This invention relates to a heat-resistant pigment and a process for manufacturing such pigment, as well as compositions of matter comprising the pigment in combination with either an organic binder or an inorganic binder.

The present invention generally comprises the calcium and sodium reduction of a zirconium mineral deposit containing various naturally occurring fluorides. It is essential to the reduction process of this invention that the fluorine bearing materials be present.

The exact chemical nature of the reaction is not known, and applicant does not want to be limited by any hypothesis or theory. However, it is believed that the reaction initially involves the sodium calcium reduction of the zirconium mineral, followed by the formation of complex zirconium-fluoro acids and the potassium salts of these acids that combine with other elements in the pigment in order to form a more stable product.

The pigment of this invention is formed by the physical and chemical treatment of a mineral deposit comprising the elements silicon, zirconium, aluminum, calcium, iron, phosphorus, sodium, magnesium, hafnium and yttrium and trace elements of manganese, titanium, tin, lead, cadmium, nickel, boron, copper, beryllium, silver, zinc, strontium and potassium.

The mineral content of the deposit treated by the process of the invention will be referred to hereafter in the specification as zircon rock and comprises primarily:

| | Percent by weight |
|---|---|
| Apatite $(CaF)Ca_4(PO_4)_3 \pm Cl-F$ | 30 |
| Albite $(NaAlSi_3O_8)$ | 3 |
| Purple zircon $(ZrSiO_4)$ | 67 |

It is obvious that the basic mineral above can be substituted by a mixture of zircon placer sands, fluorspar ores, apatite and other components to duplicate or approximate the composition of the naturally occurring zircon rock used as the starting material of this invention.

It has been found that when zircon rock is treated by the process of this invention, it can be converted into a pigment that has extremely good resistance to a high temperature environment and, further, that this property can be used to advantage when combined with organic binders such as synthetic resins and natural gums and tars or inorganic compositions such as ceramic, glass and other vitreous materials and plaster of Paris or cement. The pigment is also inert to concentrated nitric (70%—$HNO_3$), concentrated sulphuric (95%—$H_2SO_4$), and concentrated hydrochloric acid (37%—HCl).

It has been found that after heating the pigment for approximately six hours at 1000° F., that it will fluoresce when activated by ultraviolet short and long wave light.

It is significant that none of the basic rock minerals will fluoresce in both wave lengths prior to the chemical treatments of this invention whereas zircon, molybdenum and uranium oxides do fluoresce in ultraviolet short wave length light prior to heating, however they do not fluoresce in ultraviolet long wave length light prior to heating. The pigment will also give violet, yellow, blue, green and white light after being activated by heat. These qualities make the pigment of this invention suitable for use in fluorescent applications known in the art.

Example 1

A pigment was prepared by grinding 145 gms. of zircon rock to a powder-like consistency, adding 30 ml. of 40° Baumé sodium silicate, 22 gms. calcium sulphate, 10 gms. sodium hypochloride, and 20 ml. of nitric acid (70%—$HNO_3$). Other mineral acids may be used, such as sulphuric, hydrochloric and other halogen acids, phosphorous acids, but nitric acid is preferred. Enough water is then added to make a slurry of the dry ingredients. Usually 200 mls. of water is sufficient for the proportions and amounts of ingredients indicated above. The mixture is brought to a boil and when fluorine gas is evolved, the evolution is stopped by adding 10 gms. of ground zircon rock and 5 ml. of glycerine. The resultant product is washed with a dilute acid solution, preferably hydrochloric acid, however, other halogen acids can be used. The solution is decanted and the precipitate is washed with water. The water is then separated and the precipitate that is left is washed with alcohol. Any alcohol can be used, e.g., methyl, ethyl, propyl, n-butyl, iso-butyl, amyl, hexyl, heptyl, nonyl, etc.; however, methyl ethyl, propyl and butyl alcohols are preferred. The precipitate is then dried at 1000° F. for 30 minutes.

Upon performing a semi-quantitative analysis, the pigment was found to have the following composition expressed in parts per million (p.p.m.):

| | |
|---|---|
| Si | 60,000–100,000 |
| Zr | 5,000–60,000 |
| Al | 50,000 |
| Ca | 10,000–15,000 |
| Fe | 8,000–20,000 |
| P | 1,000 |
| Na | 8,000–10,000 |
| Mg | Trace |
| Mn | Trace |
| Ti | Trace |
| Sm | Trace |
| Pb | Trace |
| Cd | Trace |
| Ni | Trace |
| B | Trace |
| Cu | Trace |
| Be | Trace |
| Ag | Trace |
| Zn | Trace |
| Hf | 1,000–3,000 |
| Y | Trace |
| Sr | Trace |
| K | Trace |

Example 2

A pigment was prepared by heating 150 gms. of finely ground zircon rock and 35 mls. of 40° Baumé sodium silicate, 25 gms. calcium sulphate and enough water to make a slurry of the dry ingredients, 200 mls. being preferred for the above quantities and proportions of dry ingredients. Fifty-five mls. of mineral oil is added and the composition brought to a boil again and 12 mls. of glycerine are added, along with 6 gms. calcium chloride, 12 gms. of sodium hypochlorite, and 20 mls. of a mineral acid, such as nitric, hydrochloric and the other halogen acids, sulphuric or the phosphorus acids. Concentrated nitric acid (37%) is preferred. Five mls. of glycerine are added after fluorine gas has ceased to evolve from the mixture and the resultant product is cooled and washed as described in Example 1.

*Example 3*

One hundred fifty grams of ground zircon rock referred to hereafter as radioactive zircon rock, having the following mineral constituents is used in place of the material utilized in Examples 1 and 2:

| | Percent by weight |
|---|---|
| (a) Zircon rock | 87 |
| (b) Allanite | 4 |
| (c) Euxenite | 2 |
| (d) Titaniferous ilmenite | 2 |
| (e) Molybdenite | 4 |
| (f) Tourmaline | 1 |

One hundred grams of this radioactive zircon rock are heated with 30 mls. of 40° Baumé sodium silicate, 20 gms. of calcium sulphate, 6 gms. of sodium fluoride, 5 mls. glycerine 50 mls. of mineral oil, 6 gm. allanite which contains constituent oxides of thorium and uranium, and occurs as an accessory mineral with zircon oxide deposits, 6 gm. of molybdenite (molybdenum sulfide), 5 gm. calcium chloride, 5 gm. sodium hypophosphite, 6 ml. 3% hydrogen peroxide, 6 ml. of glycerine and 18 ml. of a mineral acid, for example, nitric (70%—$HNO_3$), hydrochloric (37%—HCl), and the other halogen acids, sulphuric (95%—$H_2SO_4$) and the phosphorus acids, nitric acid (70%—$HNO_3$) being preferred.

The entire mixture of solids and supernatant liquid is washed by mixing with a ten percent solution of hydrochloric acid however, other mineral acids can be used. The solids are separated and the remaining liquid is saved for extraction of phosphorus values or for recycling with fresh mineral. The solids are washed in water and then separated and rewashed in alcohol, separated and dried at 1000° F. for 30 minutes.

The following semi-quantitative spectrographic analysis was made of the pigment produced from the radioactive zircon rock:

| | Percent |
|---|---|
| Si | 34 |
| Al | 5.5 |
| Zr | 8.4 |
| Na | 2.5 |
| Ca | 0.80 |
| Mg | Trace |
| Fe | 0.88 |
| Cr | Trace |
| B | Trace |
| Mn | Trace |
| Ni | Trace |
| Cu | Trace |
| Ti | Trace |
| Y | Trace |
| Yb | Trace |
| Sr | Trace |

The pigments as prepared above in Examples 1, 2, and 3 can be utilized by the processes known in the art as powdered metallurgy, flame sprayed as a ceramic composition or with a ceramic composition or can be incorporated into an organic or inorganic binder for the purpose of imparting heat resistance to the compounded product. Generally speaking and as non-limiting examples, the following inorganic materials can be used as a binder: Synthetic organic resins prepared by addition polymerization processes such as vinyl chloride, vinyl acetate, vinyl alcohol, vinyl ethers, vinyl epoxies, vinyl acrylates, vinylene compounds of the same class as well as vinylidene compounds and various copolymers or mixtures of solid resins within this general class. The olefin polymers such as ethylene, propylene, iso-butylene and butadiene are further examples of polymers contemplated, as well as styrene, GRS rubber, halogenated styrene, chlorosulfonated olefin polymers such as chlorosulfonated ethylene, acrylic acids, acrylic esters, the substituted acrylic acids and acrylic esters, acrylic nitriles, polysulfide resins such as the Thiokol resins and the silicone resins and various copolymers and mixtures thereof.

Various condensation polymers such as the polyesters known in the art as Dacron or Mylar can be utilized with this pigment as well as any condensation product of a polyhydric alcohol and a di-basic acid and optionally a drying oil or fatty acid. A copolymerization of various polyesters with unsaturated compounds such as styrene-type monomers are also known in the art and within the scope of this invention.

The phosgene or bis-chloroformate derivatives are also contemplated, such as polycarbonates and isocyanate resins. Epoxy resins made from the condensation of Bisphenol A with epichlorohydrin and esters of these epoxy resins with various fatty acid products such as linseed oil fatty acids, castor oil fatty acids, tung oil fatty acids, oiticica oil fatty acids, etc. Amine aldehyde resins such as urea-formaldehyde and melamine formaldehyde condensation products as well as guanidine-type resins and polyamide compounds such as nylon are also contemplated.

The amine cured epoxy resins, as well as the organic acid cure and other curing agents used or known in the art for cross-linking epoxy resins for the purpose of producing a synthetic resinous material, are also deemed to be within the scope of this invention.

Acetal resins such as vinyl butyral and the various polymers of formaldehyde and other aldehydes known in the art and acrolein are also within the scope of this invention.

Phenolic resins including both the acid catalyzed two step and base catalyzed one step resin compounds are also contemplated as being within the scope of this invention. These phenolic resins can be utilized as in an alcoholic solution or other solvent or can be converted into a varnish by cooking with tung oil, linseed oil or other drying oils known in the art. These varnishes are also within the broad scope of this invention.

The modified natural products such as chlorinated paraffins and chlorinated waxes known in the art as chloro wax, nitrocellulose, rayon, and esterified resins which are known in the art as ester gums and are the condensation of naturally occurring resins containing abietic acid and pentaerythritol are also within the scope of this invention.

Natural products such as asphalts, tar, and pitch obtained either from petroleum residues or coal and coke residues are also contemplated. Natural gum materials such as gum tragacanth and arabic, naturally occurring products such as kauri and damar are also resinous constituents contemplated, as well as bodied oils such as linseed oil, tung oil, and oiticica oil.

Copolymers of any of the above resins, modified natural products and natural products contemplated as well as mixtures of the above compounds can be used with the pigment of this invention.

The pigment can also be generally used in an inorganic binder the following being non-limiting examples of this type of binder: glasses and other vitreous as well as non-vitreous glass-like compositions; ceramic compositions made from various clays, for example, kaolin-type clays and compounds such as plaster of Paris, cement, and sodium silicate.

The following is an example of a paint composition using the pigments prepared from either Examples 1, 2, or 3:

Pigment—30% by weight.
Vehicle—70% by weight.

| Pigment: | Percent by weight |
|---|---|
| Zirconium product of Examples 2 or 3 | 98 |
| Zirconium oxide | 2 |
| Total | 100 |

| Vehicle: | |
|---|---|
| Gum arabic | 3 |
| Sodium silicate | 3 |
| Vinylwax (registered trademark of the Simoniz Co., Chicago, Ill.) | 11 |
| Residue solution from 10% HCl wash of finished product of Example 3 | 15 |
| Soya alkyd maleic resin and heat bodied linseed oil, petroleum hydrocarbon resin | 31 |
| Mineral oil (non volatile) | 37 |
| Total | 100 |

| Paste composition: | |
|---|---|
| Pigment from Example 1 | 94 |
| Vehicle | 6 |
| Total | 100 |

| Vehicle: | |
|---|---|
| Residue solution from 10% HCl wash of finished product of Example 3 | 2 |
| Distilled water | 1 |
| Sodium silicate | 3 |
| Total | 6 |

It has also been found that the pigment when mixed with banana oil will form a paste that when applied to a metal surface will withstand 1000° F. temperatures for a period of six hours.

The residue from processing the zircon rock can be recycled and the components separated for reaction with fresh zircon rock or the phosphate values can be extracted from the solution to be utilized as plant fertilizers.

What is claimed is:

1. A pigment produced by a process comprising the steps of heating ground zircon rock, sodium silicate, calcium sulphate, mineral oil, glycerine, calcium chloride, sodium hypochlorite, sodium fluoride, and a mineral acid with enough water to form a flowable slurry, boiling until fluorine gas is evolved, stopping said evolution of fluorine gas by adding zircon rock and glycerine, washing the residue with a mineral acid and water and drying said residue.

2. A composition of matter comprising the product of claim 1 and an organic binder.

3. A composition of matter comprising the product of claim 1 and an inorganic binder.

4. A pigment produced by the process comprising the steps of heating ground zircon rock, sodium silicate, calcium sulphate and a quantity of water to form a flowable slurry of the dry ingredients, boiling, adding mineral oil, boiling further, adding glycerine, calcium chloride, sodium hypophosphite, and a mineral acid, adding glycerine after fluorine gas has ceased to evolve, cooling the residue and washing with mineral acid and water and drying said residue.

5. A composition of matter comprising the pigment of claim 4 and an organic binder.

6. A composition of matter comprising the pigment of claim 4 and an inorganic binder.

7. A pigment produced by the process comprising the steps of heating radioactive ground zircon rock, sodium silicate, calcium sulphate, sodium fluoride, glycerine, enough water to form a flowable slurry, adding mineral oil, allanite, molybdenite, calcium chloride, sodium hypophosphite, hydrogen peroxide, a mineral acid, and glycerine, washing the residue with mineral acid and water, and drying said residue.

8. A composition of matter comprising the pigment of claim 7 and an organic binder.

9. A composition of matter comprising the pigment of claim 7 and an inorganic binder.

No references cited.

REUBEN EPSTEIN, *Primary Examiner.*
CARL D. QUARFORTH, *Examiner.*